Oct. 24, 1950  J. O. PARR, JR  2,527,148
APPARATUS FOR SEPARATION OF BLASTING CIRCUIT LEADS
Filed Jan. 4, 1946
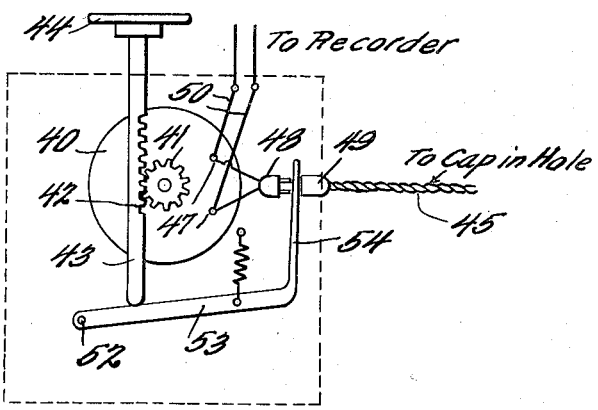
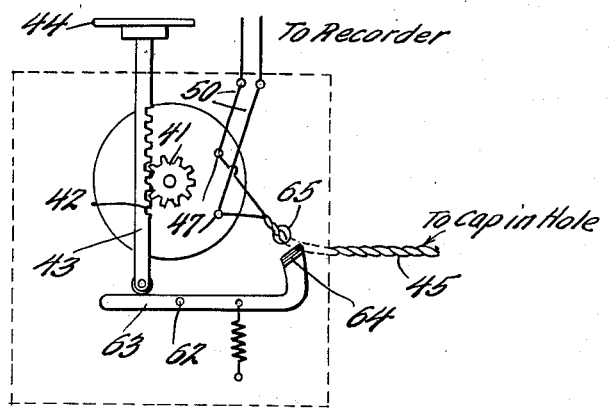
Inventor
J. O. Parr, Jr.
By Watson, Cole, Grindle + Watson
Attorney Patented Oct. 24, 1950

2,527,148

UNITED STATES PATENT OFFICE 2,527,148

APPARATUS FOR SEPARATION OF BLASTING CIRCUIT LEADS

Josephus O. Parr, Jr., San Antonio, Tex., assignor to Olive S. Petty, San Antonio, Tex.

Application January 4, 1946, Serial No. 638,948

4 Claims. (Cl. 102—22)

This invention relates to methods of and apparatus for separating the electric conductors, which connect an electrically ignited blasting cap with the source of blasting current, at substantially the instant of firing the shot. This application is a continuation-in-part of my prior application for United States Letters Patent, Serial No. 473,997, filed January 29, 1943, now Patent No. 2,407,442, granted September 9, 1946.

It is a general object of the present invention to provide novel methods of and apparatus for entirely disconnecting the cap leads, in a blasting circuit, from the source of current supply for firing the cap, and from any recording equipment which may be associated with the same for making records of the shot firing time.

It is a further object to disconnect the cap conductors from any other electrical apparatus with which they may have been associated for providing the operating current or recording the instant of breakage of the bridge wire in the cap, just as soon as the shot has been fired and before the conductors can be blown sufficiently far from the hole to contact with any high voltage lines.

An important feature of the invention resides in the use of means to completely electrically isolate the cap and at least the portion of its conductors which are blown from the shot hole by the force of the explosion, from any electrical equipment and personnel so that no injury or damage can result if the cap conductors are blown into contact with high voltage lines.

Other and further features and objects of the invention will be more apparent to those skilled in the art upon a consideration of the accompanying drawings and following specification, wherein are disclosed exemplary embodiments of the invention with the understanding that such changes, combinations thereof, and modifications may be made therein as fall within the scope of the appended claims without departing from the spirit of the invention.

In said drawings:

Figure 1 is a schematic showing of an embodiment wherein the conductors are separated at the blasting machine under the action of the manual means for operating the same; and Figure 2 illustrates a modification of the embodiment shown in Figure 1.

In the firing of "shots" in connection with seismic prospecting and similar work, the explosive is located below the ground, in what is commonly called a shot hole. All such shots are fired electrically, and for the purpose a pair of conductors must lead down the hole, which is often cased to permit it to be used several times or for other reasons. Such conductors lead to the blasting machine, or other voltage source, and also to the recording apparatus, enabling a record to be made of the instant of firing the shot. The shot holes are often arranged adjacent to or directly beneath high voltage power lines or service lines leading to dwellings or other buildings, and these conductors are often ejected violently from the shot hole and may be thrown over power lines, not only subjecting the operator of the blasting machine to the danger of injury or electrocution, but oftentimes ruining the recording apparatus.

In accordance with the present invention therefore, it is proposed to associate with the blasting machine a device for disconnecting the conductors, leading to the cap from any other circuits with which they may have been connected, immediately subsequent to the firing of the shot, so that the record may be completed but the conductors disconnected before the cap wires can be blown out of the hole.

In the form of the invention illustrated in Figure 1, a blasting machine is employed to supply the firing voltage. Such a blasting machine may comprise a direct current generator 40 having a pinion 41 mounted on the shaft and adapted to engage with teeth 42 on a rack bar 43 vertically mounted in the casing as a plunger and equipped with a T-handle 44 to be violently depressed by the operator to speed up the generator and build up sufficient current to fire the cap in the customary manner.

In this case the cap leads 45 are connected to the terminals 47 of the generator through a suitable separable connector including parts 48 and 49, one of which is fixed to the casing of the generator. Conductors 50 also extend from the terminals 47 to the recording equipment. These are shown as connected in shunt to the cap conductors, but under certain conditions there might be a series arrangement of the cap, the blasting machine, and the recorder. The exact arrangement of this circuit has no bearing on the claimed part of this invention.

In order to ensure the separation of the connector parts 48 and 49, a bell-crank lever is pivoted at 52 in the generator casing and has a substantially horizontal arm 53 positioned to be engaged and depressed by the plunger 43, near the lower end of its stroke, after the generator has built up a sufficient voltage to fire the cap. The other arm 54 of the bell-crank lever is normally substantially vertical and its extreme end projects between the two portions of the separable connector without separating them. Depression of the part 53 moves the vertical arm 54 to the right and separates the two parts of the connector, effectively severing the cap leads from the rest of the equipment almost instantly after the firing, so that no damage may be done to the operator or the equipment. The showing is entirely schematic and no limitations, except as expressed in the claims, are intended. It will be clear that a simple shear mechanism could sever the conductors under the control of the lever 54 if it were desired to renew them at this position each time a shot was fired. Those portions of the conductor which enter the hole can well be severed, since they are seldom fit to be re-used after being subjected to the punishment of being blown from the hole by the shot. The application of such a shear mechanism to a blasting machine is illustrated in Figure 2, in which the structure is, for the most part, similar to that shown in Figure 1, similar numerals being employed to designate similar parts. In this modification, the cap leads or conductors 45 are passed through an opening 65 in a wall of a housing for the blasting machine, or other convenient wall, the edge of the opening 65 serving as a ledger plate. The lever 63, pivoted at 62, and positioned for actuation by the plunger 43, is provided with a cutting blade or shearing edge 64, the latter moving across the opening 65 when the plunger 43 is operated to sever the cap conductors. In this way, a complete separation of both conductors is effected in much the same way as in the principal embodiment of my parent application, hereintofore identified. As in the case in the form of the invention shown in Figure 1, the parts are so designed and arranged that the conductors are severed almost instantly after the firing of the cap, thereby eliminating possible damage to the operator or the equipment such as might result from the blowing of either conductor over a high tension line.

It will be appreciated that mechanism similar to that described herein may be employed to sever and completely release the conductors after firing where the voltage is supplied by batteries or by any other source than the generator illustrated herein. Thus the plunger of the illustrated embodiments may be used to close a switch to fire the cap, the switch being either closed directly by the plunger or by the shaft on which the gear 41 is mounted.

Having thus described the invention, what is claimed as new and desired to be secured by Letters Patent is:

1. A blasting machine for firing shots for seismic surveying including, in combination, a generator, a manually actuated plunger to rotate the generator shaft through a limited number of revolutions, conductors extending from said generator for connection to a blasting cap, a releasable connection in the circuit of each conductor located at said blasting machine, and lever means engaged and actuated by said plunger near the end of its stroke to release both said connections and thereby separate said conductors from said blasting machine.

2. Mechanism for firing shots for seismic surveying including, in combination, a pair of conductors extending to a blasting cap, means including a manually operable device for supplying voltage to said conductors to fire said cap, and lever means engaged and actuated by operation of said device for shearing both conductors between said cap and said device, and adjacent the latter, immediately after firing of the cap.

3. In electric shot firing apparatus of the type comprising an electric percussion cap having a bridge wire, a source of current for firing said cap, recording apparatus for making a record of the instant of firing the cap as indicated by the breaking of the bridge wire therein, and conductors leading from the said source to the recording apparatus, the combination therewith of conductors leading from the source to the cap in a shot hole, of means including a manually operable device for supplying voltage to said conductors to fire the cap, and lever means including a blade engaged and movable by said device on operation of the latter to sever both conductors adjacent said device after said cap is fired.

4. Mechanism for firing shots for seismic surveying including, in combination, a pair of conductors extending to a blasting cap, means including a manually operable device for supplying voltage to said conductors to fire said cap, and lever means mechanically connected with said device and actuated by operation thereof for effecting complete disconnection and release of both conductors at said device, immediately after firing the cap.

JOSEPHUS O. PARR, Jr.

REFERENCES CITED

The following references are of record in the file of this patent:

UNITED STATES PATENTS

| Number | Name | Date |
|---|---|---|
| 866,838 | Broadwater | Sept. 24, 1907 |
| 941,852 | Broadwater | Nov. 30, 1909 |
| 1,194,228 | Purdon | Aug. 8, 1916 |
| 1,376,166 | Rosenburg | Apr. 26, 1921 |
| 1,890,445 | Asire et al. | Dec. 13, 1932 |
| 2,044,666 | Burney | June 16, 1936 |
| 2,129,835 | Glossl | Sept. 13, 1938 |